United States Patent
Ando et al.

(10) Patent No.: US 8,396,659 B2
(45) Date of Patent: Mar. 12, 2013

(54) NAVIGATION DEVICE, METHOD, AND PROGRAM

(75) Inventors: Yohei Ando, Kasugai (JP); Daisuke Sakaki, Sapporo (JP); Yusuke Oohashi, Sapporo (JP)

(73) Assignee: Aisin AW Co., Ltd., Anjo (JP)

( * ) Notice: Subject to any disclaimer, the term of this patent is extended or adjusted under 35 U.S.C. 154(b) by 535 days.

(21) Appl. No.: 12/656,942

(22) Filed: Feb. 19, 2010

(65) Prior Publication Data
US 2010/0217522 A1    Aug. 26, 2010

(30) Foreign Application Priority Data

Feb. 26, 2009  (JP) ................ 2009-043790

(51) Int. Cl.
*G01C 21/12* (2006.01)
*G01C 21/30* (2006.01)
*G01C 21/00* (2006.01)
G01C 21/16 (2006.01)
G01C 21/08 (2006.01)

(52) U.S. Cl. ........ 701/446; 701/469; 701/472; 701/501; 701/504; 701/518

(58) Field of Classification Search ........... 701/400–541
See application file for complete search history.

(56) References Cited

U.S. PATENT DOCUMENTS

| 4,890,233 | A | * | 12/1989 | Ando et al. | 701/530 |
| 5,307,277 | A | * | 4/1994 | Hirano | 701/472 |
| 5,469,158 | A | * | 11/1995 | Morita | 340/988 |
| 5,852,791 | A | * | 12/1998 | Sato et al. | 701/446 |
| 5,906,653 | A | * | 5/1999 | Ichimura et al. | 701/446 |
| 6,401,036 | B1 | * | 6/2002 | Geier et al. | 701/495 |
| 2003/0036847 | A1 | * | 2/2003 | Geier et al. | 701/209 |
| 2011/0071755 | A1 | * | 3/2011 | Ishigami et al. | 701/208 |

FOREIGN PATENT DOCUMENTS

JP    A-2005-114632    4/2005

* cited by examiner

*Primary Examiner* — Khoi Tran
*Assistant Examiner* — Dale Moyer
(74) *Attorney, Agent, or Firm* — Oliff & Berridge, PLC

(57) ABSTRACT

Devices, methods, and programs provide vehicle navigation. A speculative heading error is acquired that corresponds to the reliability of the vehicle heading, which corresponds to an estimated vehicle position that was calculated using a previous vehicle position as a reference. A best candidate position or the estimated vehicle position is set as the vehicle position depending on whether a heading difference between the vehicle heading and a heading when the estimated point is corrected to the best candidate position falls within the speculative heading error. Therefore, false matching can be further reduced and prompt recovery is possible even if a false match occurs.

15 Claims, 9 Drawing Sheets

FIG. 2A

| RELIABILITY | HEADING | DISTANCE |
|---|---|---|
| 5 | WITHIN APPROX. 1 [°] | WITHIN APPROX. 5 [m] |
| 4 | WITHIN APPROX. 3 [°] | WITHIN APPROX. 10 [m] |
| 3 | WITHIN APPROX. 10 [°] | WITHIN APPROX. 25 [m] |
| 2 | WITHIN APPROX. 45 [°] | WITHIN APPROX. 50 [m] |
| 1 | UNKNOWN | UNKNOWN |

FIG. 2B

| NO. | ITEM | ESTIMATED RELIABILITY | | GPS RELIABILITY | |
|---|---|---|---|---|---|
| | | HEADING | DISTANCE | HEADING | DISTANCE |
| 1 | PREVIOUS RELIABILITY | O | O | | |
| 2 | SPECULATIVE CUMULATIVE HEADING ERROR | O | | | |
| 3 | GYRO SENSITIVITY LEARNING STATE | O | | | |
| 4 | ESTIMATED HEADING RELIABILITY | | O | | |
| 5 | DISTANCE COEFFICIENT LEARNING STATE | | O | | |
| 6 | GPS/ESTIMATED PATH HEADING COINCIDENCE | | | O | |
| 7 | SPEED | | | O | |
| 8 | HDOP | | | O | O |
| 9 | GPS/ESTIMATED PATH POSITION COINCIDENCE BASED ON INTER-COORDINATE DISTANCES | | | | O |
| 10 | GPS/ESTIMATED PATH POSITION COINCIDENCE BASED ON INTER-COORDINATE HEADINGS | | | | O |

FIG. 3

| RELIABILITY | PREVIOUS RELIABILITY | CUMULATIVE HEADING ERROR [°] | GYRO SENSITIVITY LEARNING STATE | ESTIMATED HEADING RELIABILITY | DISTANCE COEFFICIENT LEARNING STATE |
|---|---|---|---|---|---|
| 1 | 1 | 45~ | UNLEARNED | 1 | UNLEARNED |
| 2 | 2 | 10~45 | 1~10 | 2 | 1~10 |
| 3 | 3 | 3~10 | 11~20 | 3 | 11~20 |
| 4 | 4 | 1~3 | 21~30 | 4 | 21~30 |
| 5 | 5 | 0~1 | 31 OR MORE | 5 | 31 OR MORE |

FIG. 4

| RELIABILITY | GPS/ESTIMATED PATH HEADING COINCIDENCE (AVG. HEADING DIFFERENCE [°]) | SPEED [km/h] | HDOP | GPS/ESTIMATED PATH POSITION COINCIDENCE BASED ON INTER-COORDINATE DISTANCES (CORRELATION VALUE) | GPS/ESTIMATED PATH POSITION COINCIDENCE BASED ON INTER-COORDINATE HEADINGS (CORRELATION VALUE) |
|---|---|---|---|---|---|
| 1 | 20 OR MORE | 0 | 4.1~ | 41 OR MORE | 41 OR MORE |
| 2 | 11~20 | 1~10 | 3.1~4.0 | 31~40 | 31~40 |
| 3 | 6~10 | 11~20 | 2.1~3.0 | 21~30 | 21~30 |
| 4 | 1~5 | 21~30 | 1.1~2.0 | 11~20 | 11~20 |
| 5 | 0 | 31~ | 1.0 | 0~10 | 0~10 |

RELATED ART

NAVIGATION DEVICE, METHOD, AND PROGRAM

INCORPORATION BY REFERENCE

The disclosure of Japanese Patent Application No. 2009-043790, filed on Feb. 26, 2009, including the specification, drawings and abstract is incorporated herein by reference in its entirety.

BACKGROUND

1. Related Technical Fields

Related technical fields include navigation devices, methods, and programs that perform map matching for navigation.

2. Related Art

On-vehicle navigation devices that find a travel route to a destination and guide the vehicle are widely used. This type of navigation device estimates the current position of the vehicle, and uses a map matching process to identify the road on which the vehicle is currently traveling, in addition to displaying the vehicle's current position on a map and providing travel guidance.

FIGS. 9A to 9C show an outline of the map matching process. As shown in FIG. 9A for example, if the vehicle position estimated from the traveling distance and heading is an estimated position P1 with respect to an actual vehicle position R, then the current position of the vehicle can be matched to a road on the map by matching the current position to either one of candidate points A1, B1 on roads A, B in the vicinity of the estimated position P1. Matching to the candidate points A1, B1 may be determined based on their distances from the estimated position P1 or a difference between the heading in the advancing direction and the road headings, for example.

However, the matching process may falsely match the estimated position P1 after passing a branch point shown in FIG. 9A to the candidate point A1. In such case, as shown in FIG. 9B, if subsequent travel on the road is nearly straight, the matching process may continue to match an estimated position P2 at the next matching point to the falsely matched road A. Then, as FIG. 9C shows, at an estimated position P3 where the direction of the actually traveled road B changes considerably, the false matching is corrected when a match is made to a candidate point B3 on the road B and the current position is thus corrected to the candidate point B3 on the correct road.

Matching to the correct road may thus be delayed, particularly in the case of a false match after traveling a road that branches at a narrow angle. Hence, due to the high probability of a false match after a junction, a threshold is conventionally set as a predetermined distance traveled from the junction and map matching delayed until the threshold is traveled.

Art according to Japanese Patent Application Publication No. JP-A-2005-114632 describes map matching that takes into account the road widths at branch points and the amount of space between roads. In the case of a method that prevents false matching by using a distance traveled from the junction, however, a match is not necessarily made to the correct road after passing the threshold.

SUMMARY

Although the art described in JP-A-2005-114632 takes into account the road shape, there is a possibility of a false match when the shape is different from the actual road due to an error in road data or the like. In any case, the false matching is likely to continue once a false match is made, and a match to the correct road will not be made until the actual travel heading changes considerably. As an example of a case where the actual road and the road data are different, the road inside a tunnel may be constituted as a straight line in the road data even though the actual road curves. In this case, a false match occurs when the vehicle position is forcibly matched to the road data and inaccurate travel path data is saved.

The present invention further reduces false matching. According to exemplary implementations of the broad inventive principles described herein, a speculative heading error is acquired that corresponds to the reliability of a vehicle heading, which corresponds to an estimated point that was calculated using a previous vehicle position as a reference. A best candidate point or the estimated point is set as the vehicle position depending on whether a heading difference $\theta$ between the vehicle heading and a heading when the estimated point is corrected to the best candidate point falls within the speculative heading error. Therefore, false matching can be further reduced and prompt recovery is possible even if a false match occurs.

Exemplary implementations provide devices, methods, and programs that recall a previous vehicle position, use the previous vehicle position as a reference and calculates an estimated vehicle position as a result of subsequent movement. The devices, methods, and programs use the estimated vehicle position in a map matching process to select a best candidate position from candidate positions that are set on roads around the estimated vehicle position, calculate a vehicle heading corresponding to the estimated vehicle position, and calculate a heading reliability at the estimated position. The devices, methods, and programs acquire a speculative heading error that corresponds to the calculated heading reliability, calculate a candidate heading as a heading when the estimated vehicle position is corrected to the best candidate position, and calculate a heading difference between the vehicle heading and the candidate heading. The devices, methods, and programs determine whether the calculated heading difference is within the acquired speculative heading error, set the best candidate position as a current vehicle position if the calculated heading difference is within the acquired speculative heading error, and set the estimated position as the current vehicle position if the calculated heading difference is not within the acquired speculative heading error.

BRIEF DESCRIPTION OF THE DRAWINGS

FIGS. 2A and 2B are explanatory drawings that outline factors and definitions of reliability;

FIG. 3 is an explanatory drawing of factors that determine the reliability of an estimated heading and distance;

FIG. 4 is an explanatory drawing of factors that determine the reliability of a GPS heading and distance;

DETAILED DESCRIPTION OF EXEMPLARY IMPLEMENTATIONS

Figure 1:
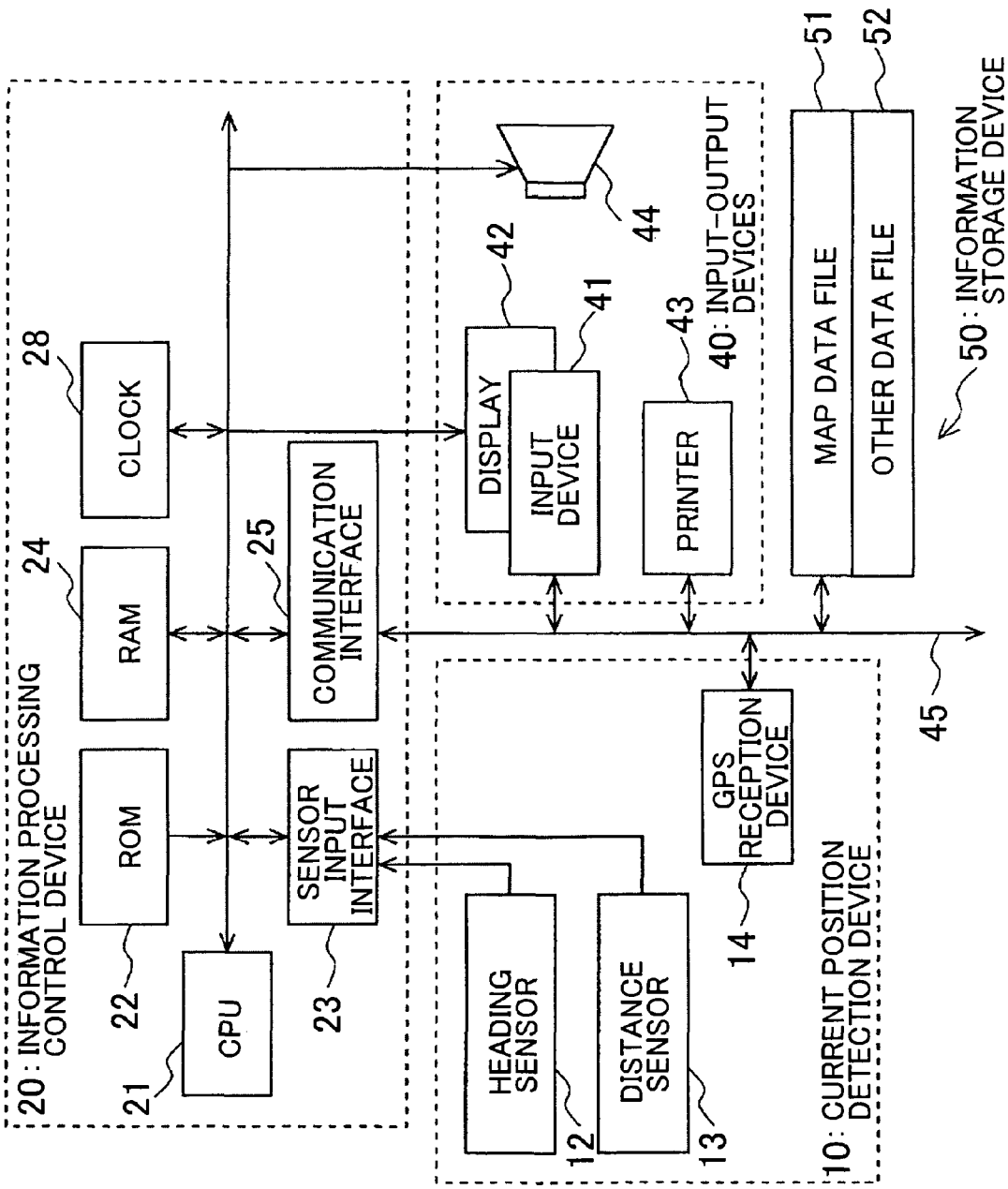
FIG. 1 is a system diagram of a navigation device according to an example.

A example of a navigation device and a navigation program according to the present invention will be described in detail below with reference to FIGS. 1 to 8C.

I. Overview of the Example

A map matching process of the navigation device employs dead reckoning navigation, which uses a distance sensor and a heading sensor to detect a movement distance and a travel heading of a vehicle and estimates a current position (estimated position) on map data. Candidate points are set on roads within a predetermined distance range from the estimated position, and the candidate points are shifted depending on the movement distance of the vehicle.

Using the distance and heading from the estimated position to the candidate points and the like as parameters, a best candidate point is then calculated and the estimated position corrected so as to coincide with the best candidate point.

In the map matching process of the present example, the reliability of a heading based on an estimated path found by dead reckoning navigation and the reliability of a heading based on GPS measurements are calculated, and a speculative heading error is acquired based on the heading with greater reliability. This reliability is a value that expresses the extent of an error range within which the heading value can be correctly estimated, and is determined depending on various states where the heading is measured based on dead reckoning navigation and GPS.

If the heading when the estimated position is corrected to the best candidate point (heading according to the road of the best candidate point) is within the range of the acquired speculative heading error, the estimated position is corrected by changing the estimated position to the best candidate point. Consequently, the best candidate point is displayed as the current position of the vehicle on a map that is displayed on a display device.

On the other hand, if the heading when the estimated position is corrected is not within the range of the acquired speculative heading error, the estimated position is not corrected (not changed to the best candidate point) because it is highly likely to be a false correction. However, the best candidate point is displayed as the current position of the vehicle on the map that is displayed on the display device. A subsequent map matching process is then performed based on the estimated path from the uncorrected estimated position.

Thus, corrections are made as long as the corrected heading is within the range of the speculative heading error based on reliability but no correction is made if the corrected heading is not, which can further reduce false matching. In the case of false matching on branching roads and especially junctions branching at narrow angles, the distance until the vehicle position is returned to the correct road can be shortened. Further, if the actual road and the road data are different, the vehicle position is not forcibly matched to the road data. Therefore, in addition to reducing false matches, more accurate travel path data can be recorded.

According to the present example, the reliability of the estimated path heading is determined from a previous reliability, a speculative cumulative heading error (heading variation amount), and a gyro sensitivity learning state. The reliability of the GPS heading is determined from a GPS/estimated path heading coincidence (comparison of the GPS and estimated path heading variation amounts), a GPS speed, and DOP.

II. Details of the Example

FIG. 1 is a system configuration diagram of the navigation device in which the present example is used. The navigation device is installed in a vehicle and, as shown in FIG. 1, includes a current position detection device 10, an information processing control device 20, input-output devices 40, and an information storage device 50.

The current position detection device 10 is structured as follows. A heading sensor 12 detects an angle that changes relative to a reference angle (absolute heading). The present example employs a gyro sensor that uses angular velocity to detect angular variation. Note that the heading sensor 12 may be an optical rotation sensor that is attached to a rotating portion of the steering wheel, a rotating type of resistance volume, or an angle sensor that is attached to a wheel portion of the vehicle. The heading sensor 12 is a geomagnetic sensor that detects the direction in which the vehicle is facing, by using a magnet to detect the direction north, for example. The heading sensor 12 may be any unit that detects an absolute heading. A distance sensor 13 can measure the movement distance of the vehicle, and may detect and count rotations of the wheel or detect and integrate twice an acceleration, for example. A GPS (Global Positioning System) reception device 14 receives signals from an artificial satellite, and is capable of obtaining various information such as the signal transmission time, positional information relating to the reception device, the movement speed of the reception device and the advancing direction of the reception device.

The information processing control device 20 is a device for performing computations and control on the basis of information input from the current position detection device 10 and the input-output devices 40 and information stored in the information storage device 50, and performing control to ensure that the computation results are output to an output unit such as a display 42, a printer 43, or a speaker 44.

The information processing control device 20 is structured as follows. A controller (e.g., CPU (central processing unit) 21) performs overall computations and control for the entire navigation device. A ROM 22 stores various programs such as programs relating to navigation, including route searches to a destination and display and voice guidance, and map matching processing programs according to the present example that are based on the reliability of estimated and GPS headings. The ROM 22 may be divided into a first ROM and a second ROM, wherein navigation programs relating to voice guidance are stored in the second ROM and the other programs are stored in the first ROM.

Reliability data described later is defined in the map matching program of the present example. However, a reference table of reliability data may be provided independent of the program and reliability data referenced over the course of executing the program, or reliability data files may be saved to the information storage device 50.

A RAM 24 stores information that the user inputs, such as destination information, information on a point that the vehicle passes, and the like that are input from an input device 41. The RAM 24 is also a storage unit for storing the results of computations that the CPU 21 makes based on the information that is input by the user, route search results, and map information that is read in from the information storage device 50. In addition, the RAM 24 temporarily saves an estimated position and candidate points that are to be used in map matching according to the present example.

A communication interface 25 inputs and outputs various information through a transmission line 45. More specifically, the GPS reception device 14, the input device 41, the printer 43, and the information storage device 50 are connected through the transmission line 45. A clock 28 keeps time.

An image processor dedicated to image processing and used for processing vector information that is processed by the CPU 21 into image information, an image memory that stores the image information processed by the image processor, and an audio processor dedicated to audio processing and used for processing audio information read in from the information storage device 50 and outputting to the speaker 44 may be additionally provided.

The input-output devices 40 include the input device 41, the display 42, the printer 43, and the speaker 44. The user uses the input device 41 to input data such as a destination, a point that the vehicle passes, a search condition, and the like. The display 42 displays an image. The printer 43 prints information. The speaker 44 outputs the audio information. The input device 41 includes a touch panel, a touch switch, a joystick, a key switch, or similar, for example. The display 42 displays a map of the periphery of the current location and a travel route to the destination. Note that the input-output devices 40 may not include the printer 43.

The information storage device 50 is connected to the information processing control device 20 through the transmission line 45. The information storage device 50 stores a map data file 51 and an other data file 52. The information storage device 50 is generally configured from an optical storage medium such as a DVD-ROM or a CD-ROM, or from a magnetic storage medium such as a hard disk or the like, but it may also be configured from any one of various types of storage media, such as a magneto optical disk, various types of semiconductor memory, or the like. Note that the information storage device 50 may be configured from a rewritable hard disk, flash memory or the like for information requiring rewriting, and a ROM such as a CD-ROM or DVD-ROM used for other static information.

The map data file 51 stores map data, road data, destination data, guidance point data, and other data as various data required for map display, route searching, and route guidance in navigation. As map data, a national road map, road maps of various regions, residential maps, and the like are stored. The road maps include various types of roads, such as main arterial roads, expressways, secondary roads, and the like, as well as terrestrial landmarks (facilities and the like). The residential maps include graphics that show the shapes of terrestrial structures and the like, as well as street maps that indicate street names and the like. The secondary roads are comparatively narrow roads with rights of way that are narrower than the prescribed values for national routes and prefectural routes. The map data includes a map with a fixed range according to a predetermined scale, which includes the vehicle current position and points instructed by the user and is displayed on the display 42. The current position of the vehicle and instructed points are displayed on the map.

The road data includes node data and link data, which are data relating to roads such as road locations and types, the number of vehicle lanes, and connection relationships between roads. The road data is used in route searching and map matching, and also used when a travel route found is displayed superimposed on the map data. The node data represents geographical coordinate data of nodes that are used for route searches on maps. For example, connection points of roads such as intersections are represented by nodes, and roads between connection points (that is, non-branching areas of roads) are expressed by links. Thus, the node data also functions as route data that represents route connection relationships. Attributes expressing traffic regulations that constrain travel, including no entry and one-way traffic, are assigned to the links, and such attributes may also be assigned to intersection nodes. The node data includes intersection nodes that are always set for intersections, and auxiliary nodes that may be secondarily set at characteristic points between intersections (e.g. points that specify the start, middle and end of curves, points where the elevation changes, and the like). Intersection nodes include information relating to intersections, such as the names and geographical position coordinates of intersections.

The destination data includes the names and locations of major tourist areas, buildings, facilities, places such as companies and sales offices that are listed in telephone directories and that are highly likely to become destinations, and the like. The guidance point data is guidance data for points requiring guidance, including guidance on branch points and the content of guide signs placed along roads. The other data file 52 stores image data of photographs that show various facilities and tourist areas as well as locations that require a visual display such as a major intersection, and audio data for when a set travel route is guided by audio.

Next, reliability data that is defined in the map matching program of the present example will be described. FIGS. 2A and 2B outline definitions and factors of reliability.

FIG. 2A specifies speculative errors for heading and distance with respect to reliability in the present example. With regard to heading, a speculative heading error of within 1 degree is assigned a reliability of 5, a speculative heading error of within 3 degrees is assigned a reliability of 4, a speculative heading error of within 10 degrees is assigned a reliability of 3, a speculative heading error of within 45 degrees is assigned a reliability of 2, and an unknown speculative heading error is assigned a reliability of 1. With regard to distance, a speculative distance error of within 5 meters is assigned a reliability of 5, a speculative distance error of within 10 meters is assigned a reliability of 4, a speculative distance error of within 25 meters is assigned a reliability of 3, a speculative distance error of within 50 meters is assigned a reliability of 2, and an unknown speculative distance error is assigned a reliability of 1. As described above, five levels of reliability are assigned for both heading and distance in the present example. However, more levels of reliability (e.g. 10 levels) may be assigned. Note that the speculative errors (for heading and distance) are specified in advance using actual measurements of values for each factor of reliability and error in each case.

FIG. 2B shows factors used for determining the reliability of the estimated heading and estimated distance, and the reliability of the heading and distance based on GPS. As shown in the figure, factors that determine the estimated (heading, distance) reliability include: previous reliability, speculative cumulative heading error, gyro sensitivity learning state, estimated heading reliability, and distance coefficient learning state. Factors that determine the GPS (heading, distance) reliability include: GPS/estimated path heading coincidence, speed, DOP, GPS/estimated path position coincidence based on inter-coordinate distances, and GPS/estimated path position coincidence based on inter-coordinate headings.

As FIG. 2B shows, the reliability of the estimated heading is determined from the previous reliability, the speculative cumulative heading error, and the gyro sensitivity learning state. The reliability of the estimated distance is determined from the previous reliability, the estimated heading reliability, and the distance coefficient learning state. The reliability of the GPS heading is determined from the GPS/estimated path heading coincidence, speed, and DOP. The reliability of the GPS distance is determined from the DOP, the GPS/estimated path position coincidence based on the inter-coordinate distances, and the GPS/estimated path position coincidence based on the inter-coordinate headings.

FIG. 3 specifies factors that determine the reliability of the estimated heading and distance. For the previous reliability, as shown in FIG. 3, the reliability of the estimated heading and the reliability of the estimated distance calculated during the previous map matching are used without modification. This is because, barring a gyro failure, the reliability of the estimated heading calculated by dead reckoning navigation is unlikely to change drastically, so the previous reliability is used unchanged. Normally, if the right and left sides of the navigation device are horizontally installed, the right and left sensitivities of the gyro sensor are practically equal. Consequently, if the right and left sensitivities of the gyro sensor become unequal, there is a high probability that learning for right-left sensitivity will be wrong and result in errors when the heading changes. Hence, because the heading error is likely to accumulate and grow with respect to heading variations while traveling a predetermined segment (e.g. 10 meters), the speculative cumulative heading error is set such that the reliability decreases as the cumulative heading error (degree) increases.

In the present example, the heading error rate is set as 0.1% for a right-left sensitivity difference of 1°. Thus, a product value from multiplying a gyro sensor right-left sensitivity difference of a° by 0.001 is accumulated each time the vehicle travels a predetermined segment. Note that a post-correction right-left sensitivity difference based on gyro sensitivity learning described next is used as the right-left sensitivity difference. The gyro sensitivity learning state represents the number of times of sensitivity learning with respect to the gyro sensor. The accuracy of the estimated heading can be considered low if the number of times of sensitivity learning is small, and the accuracy can be considered high if the number of times of sensitivity learning is large. Therefore, the reliability is set so as to increase in accordance with an increase in the number of times of learning.

Regarding the number of times of gyro sensor sensitivity learning in the present example, learning for a left turn and learning for a right turn are considered a set and counted as one time. Here, the gyro sensitivity learning corrects the sensitivity of the gyro sensor with respect to right and left turns, and is performed using various common methods. For example, angles calculated from the gyro sensor during right and left turns may be corrected by angles calculated from a travel path based on GPS positioning. Corrections made based on GPS positioning with low accuracy may reduce the sensitivity. Therefore, this learning is performed during right and left turns when the GPS positioning has high accuracy.

Such learning may use a GPS speed of 30 km/h or more and an error circle calculated from DOP having a diameter of 100 meters or less as learning start conditions. Note that the absence of buildings of at least a predetermined height around the vehicle current position may be further added as a learning start condition. The estimated heading reliability is used for calculating the reliability of the estimated distance. If the estimated heading reliability is high, then the accuracy of the estimated distance can also be considered high. Therefore, the estimated heading reliability (a final value calculated from various factors) is used without modification. The distance coefficient learning state represents the number of times of learning with respect to distance. The accuracy of the distance coefficient can be considered high (the accuracy of the estimated distance can be considered high) if the number of times of learning is large, so the reliability of the estimated distance is also set high. Here, distance learning may also use various common methods similar to the gyro sensitivity learning.

For example, using the movement distance of the vehicle calculated from GPS positioning as a reference, the number of distance pulses output by the distance sensor that measures the traveling distance of the vehicle is counted, and the number of times the movement distance was calculated for one distance pulse is set as the number of times of learning. The movement distance per one distance pulse is statistically determined based on the most common value among a distribution of movement distances calculated in each learning. Note that similar to gyro learning, distance learning is performed when the GPS accuracy is high and learning start conditions must be satisfied while the vehicle moves a predetermined distance.

FIG. 4 specifies the factors that determine the reliability of the GPS heading and distance. The GPS/estimated path heading coincidence determines the degree of coincidence of the path shape according to GPS and the estimated path shape. If the variation amount of the estimated heading and the variation amount of the GPS heading are similar (if the difference is small), the accuracy of the GPS heading can be considered high. Therefore, as shown in FIG. 4, the reliability of the GPS heading is set so as to increase with a higher degree of coincidence of both headings. Here, the GPS/estimated path heading coincidence is calculated as follows.

(a) A GPS reliability calculation position (latest GPS positioning point) is designated as a base point. A base point for the estimated path is similarly set to a position that is synchronized with the GPS base point.

(b) A maximum of 20 GPS positioning points are acquired at positioning point intervals from the base point, and a heading variation amount from the base heading is acquired for each positioning point. At such time, the GPS continuity (positioning interval) is set to within 5 seconds (with processing executed even when positioning is not performed for 2 or 3 seconds). Likewise for the estimated path, the heading variation amount from the base heading is acquired for each point corresponding to the positioning points (the estimated path coordinates are synchronized with the GPS positioning location).

(c) The differences between corresponding positioning points are calculated for each of the acquired heading variation amounts of the GPS and estimated path, and summed to calculate an average value (correlation value). This correlation value is the average heading difference (°) in FIG. 4.

Note that only GPS headings corresponding to a GPS heading reliability of 2 or more are acquired. If the GPS speed is fast, the accuracy of the GPS heading can be considered to increase. Therefore, as shown in FIG. 4, the reliability is also set so as to increase accordingly. DOP (dilution of precision) is a value that indicates a position-fix accuracy calculated from the positioning of GPS satellites. A smaller DOP is likely associated with a comparatively highly accurate GPS distance and GPS heading. Therefore, as shown in FIG. 4, the reliability is also set so as to increase accordingly. Note that a DOP value of 1.0 is the best value. Types of DOP include geometrical dilution of precision (GDOP), horizontal dilution of precision (HDOP), position dilution of precision (PDOP), and relative dilution of precision (RDOP). The present example uses HDOP, but other types may be used alone or in combination. DOP is calculated by the GPS reception device 14.

The GPS/estimated path position coincidence based on inter-coordinate distances is specified in FIG. 4. If the distance degree of coincidence with the estimated path is high, the accuracy of the GPS distance can also be considered high. Therefore, the reliability of the GPS/estimated path position coincidence based on inter-coordinate distances is also set so as to increase accordingly. The GPS/estimated path position coincidence based on inter-coordinate distances is calculated as follows.

(a) A GPS reliability calculation position (latest GPS positioning point) is designated as a base point. A base point for the estimated path is similarly set to an estimated path position to be measured that corresponds to the GPS base point.

(b) Ten GPS positioning points are acquired at intervals of 10 meters or more from the GPS base point position, and the distances between the coordinates of the positioning points and the base point (inter-coordinate distances) are calculated. Likewise for the estimated path, the distances between the coordinates of the positions corresponding to the GPS positioning points and the base point of the estimated position are calculated.

(c) The difference between the inter-coordinate distances of corresponding GPS positions (positioning points) and estimated positions as calculated at (b) are calculated for each positioning point, and the sum of the square of each difference is found to calculate an average value (correlation value). Reliability is determined from this correlation value.

The GPS/estimated path position coincidence based on inter-coordinate headings is specified in FIG. 4. Namely, if the heading degree of coincidence with the estimated path is high, the accuracy of the GPS heading can also be considered high. Therefore, the reliability of the GPS/estimated path position coincidence based on inter-coordinate headings is also set so as to increase accordingly. The GPS/estimated path position coincidence based on inter-coordinate headings is calculated as follows.

(a) A maximum of 10 GPS positioning points at intervals of 10 meters or more from the GPS reliability calculation position (latest GPS positioning point) are acquired. Based on the coordinates between two adjacent points, the heading between the two points is calculated. Note that in the present example, the intervals are set to 10 meters or more because a smaller interval between compared points will result in even slight deviations causing large changes to the heading. Likewise for the estimated path, based on the coordinates between two adjacent points among the positions corresponding to the GPS positioning points, the heading between the two points is calculated.

(b) The difference between adjacent headings among the headings calculated based on the GPS positioning points is found to calculate the estimated heading variation amount. Likewise for the estimated path, the difference between adjacent headings among the headings calculated based on the points is found to calculate the heading variation amount.

(c) The differences between corresponding GPS and estimated heading variation amounts as calculated at (b) are calculated for each point, and the sum of the square of each difference is found to calculate an average value (correlation value). Reliability is determined from this correlation value.

After finding the reliability of each factor as described above, the reliability of the final estimated heading and distance, and GPS heading and distance are calculated as average values of reliability for each factor. For example, regarding the reliability of the estimated heading, if the previous reliability of the estimated heading is 4, the reliability of the speculative cumulative heading error is 3, and the reliability of the gyro sensitivity learning state is 3, the average value of the reliability of these three factors is 3.33.

When the speculative heading error shown in FIG. 2A is calculated, a value of 3 that is rounded off from the calculated average value of 3.33 is set as the reliability (wherein an average value of 3.4 is rounded down to 3 and an average value of 3.5 is rounded up to 4, for example). Thus, the speculative heading error that corresponds to the reliability of 3 is within 10 degrees. Note that in order to further increase accuracy, the rules for rounding the calculated average value may be modified such that, for example, an average value of 3.5 is rounded down to 3 and an average value of 3.6 is rounded up to 4, or an average value of 3.6 is rounded down to 3 and an average value of 3.7 is rounded up to 4, or the average value may be rounded down to the nearest whole number.

The reliability of each factor may also be weighted. In such case, the weight of the previous reliability may be higher than that for other factors. For example, the previous reliability may have 1.5 times more weight, the reliability of the speculative cumulative heading error 0.8 times less weight, and the reliability of the gyro sensitivity learning state 0.7 times less weight. Based on the reliability calculated for each factor, a final reliability may be determined using a fuzzy control.

In the navigation device that is configured in this manner, route guidance is performed as described below.

The navigation device detects the current position using the current position detection device 10, reads map information relating to the periphery of the current position from the map data file 51 in the information storage device 50, and displays the read map information on the display 42. When a destination is input through the input device 41, the information processing control device 20 searches for (calculates) a plurality of travel route candidates from the current position to the destination and displays the travel route candidates on the map displayed on the display 42. Then, when the driver selects one of the travel routes, the selected travel route is stored in the RAM 24. Thus, a travel route is obtained (travel route acquisition unit). Note that the information processing control device 20 may also acquire the travel route by transmitting the current position of the vehicle (or a departure point that is input) and the destination to an information processing center and receiving a travel route to the destination that has been found by the information processing center. In this case, communication of the destination and travel route is performed by wireless communication via the communication interface 25.

Further, a travel route from the departure point to the destination may be searched using an information processing device such as a home personal computer or the like, whereupon the travel route is stored in a storage medium such as USB memory and obtained via a corresponding storage medium reading device. The storage medium reading device in this case is connected to the information processing control device 20 through the transmission line 45. While the vehicle is moving, route guidance is performed by tracking the current position detected by the current position detection device 10.

The route guidance specifies the vehicle's position on the map by performing map matching between the road data that corresponds to the chosen route and the current position that is detected by the current position detection device 10, then displays the chosen route and a current position mark that indicates the current position of the vehicle on the map of the area surrounding the current position of the vehicle, which is displayed on the display 42. Based on the relationship between the chosen route and the current position, a determination is made as to whether guidance is necessary. For example, in a case where the vehicle continues moving straight ahead for more than a predetermined distance, a determination is made as to whether route guidance regarding a route change point or the like and heading guidance are necessary. If the guidance is necessary, the guidance is provided by a display on the display 42 and by audio.

Figure 5:
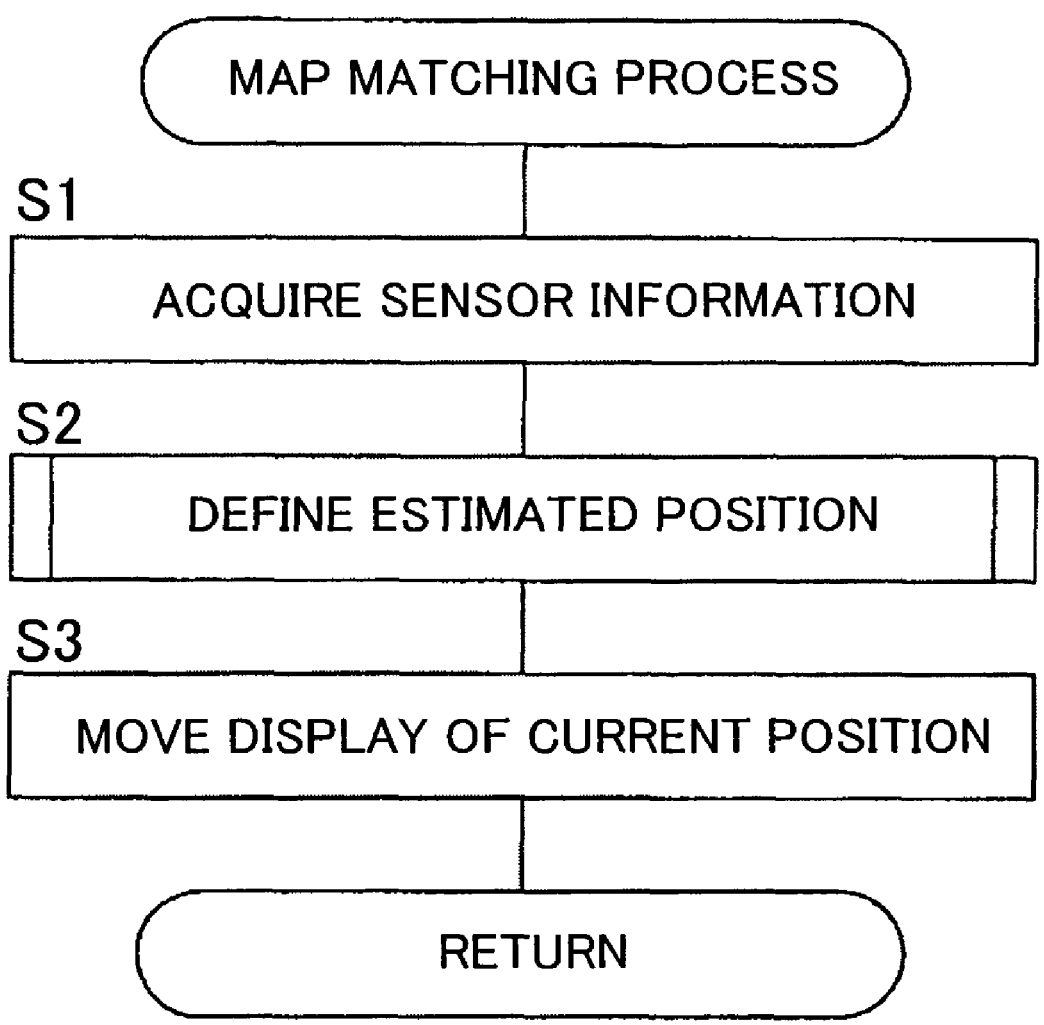
FIG. 5 is a flowchart of a map matching process.
Figure 6:
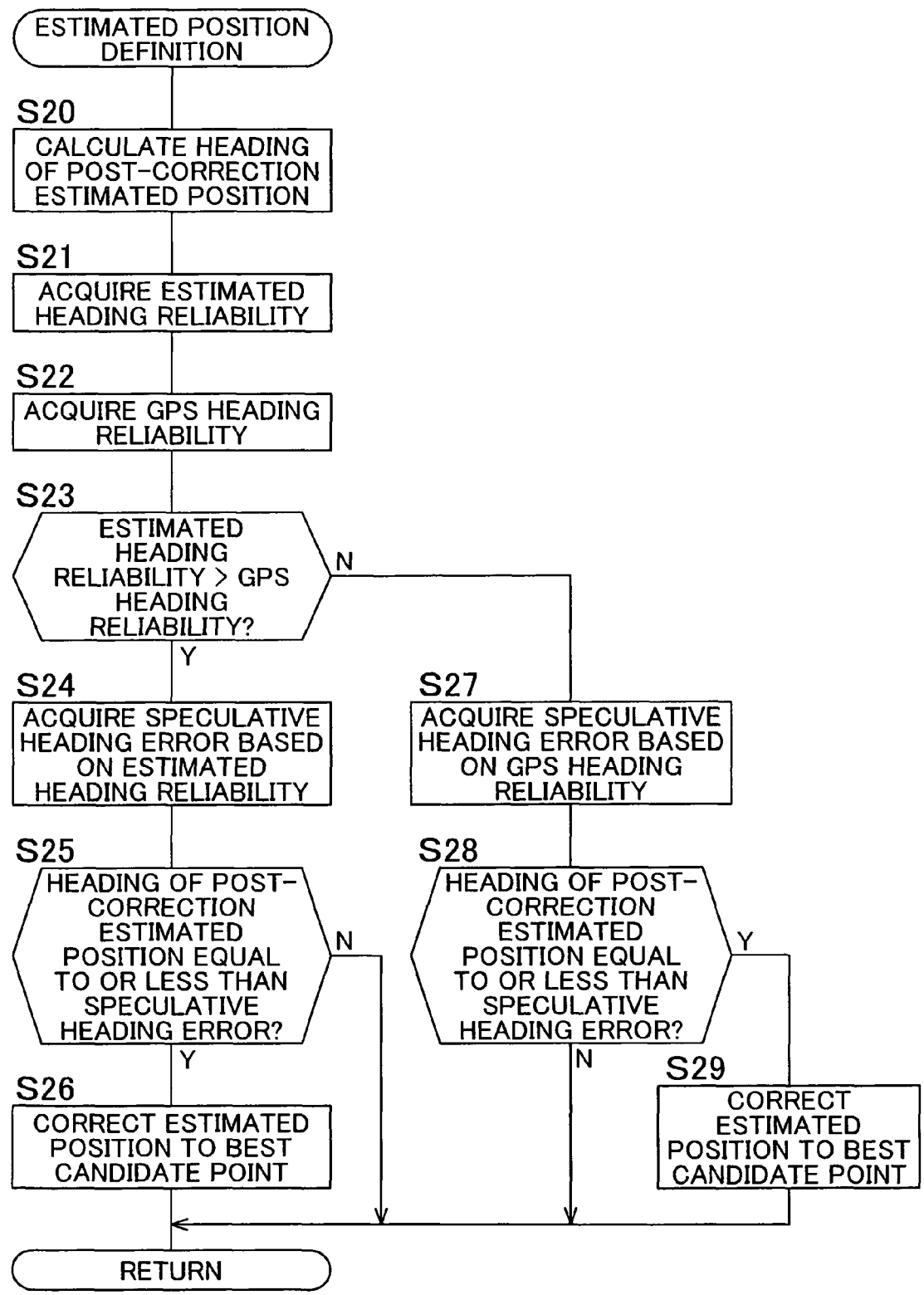
FIG. 6 is a flowchart of an estimated position definition process.

The map matching process that is performed by the navigation device structured in this manner will be described next. FIG. 5 is a flowchart of an algorithm of the map matching process in the present example. The exemplary process may be implemented, for example, by one or more components of the above-described navigation device. For example, the exemplary method may be implemented by the CPU 21 and or information processing control device 20 executing a computer program stored in the first ROM 22, second RAM 24, and/or the information storage device 50. However, even though the exemplary structure of the above-described navigation device may be referenced in the description, it should be appreciated that the structure is exemplary and the exemplary process need not be limited by any of the above-described exemplary structure.

According to the process, the information processing control device 20 acquires various sensor information detected by the current position detection device 10 and the like (S1). Based on the acquired sensor information, the information processing control device 20 then calculates and defines the estimated position (S2). Namely the estimated position is found based on dead reckoning navigation, and then the estimated position is determined from the speculative heading error range based on reliability.

Next, the information processing control device 20 ends processing to move the current position mark on the map that is displayed on the display 42 (S3). In such case, the current position mark is moved to the best candidate point regardless of whether the estimated position is corrected to the best candidate point as described later. An estimated position definition process will be described next with reference to the algorithm shown in the flowchart of FIG. 6 and the phase diagrams of FIGS. 7A to 7C and 8A to 8C.

The information processing control device 20 calculates the heading of the post-correction estimated position according to the following sequence (S20). Note that in FIG. 7A, a point P0 (A0) is the estimated position defined by the previous map matching process (estimated position after correction to the candidate point A0). Using the previous estimated position P0 as a reference, an estimated position P1 based on the vehicle movement distance and heading, and the estimated heading (advancing direction) at the estimated position P1 based on the estimated path are calculated. Candidate points for the estimated position P1 are identified.

The candidate points are set as points identified on roads within a predetermined distance Lm from the estimated position P1, and which correspond to start point candidates matched at the previous estimated position P0 that have been moved along the road by an amount corresponding to the movement distance of the vehicle.

Note that if there are no points within the predetermined distance Lm from the estimated position P1 after moving the previous candidate point P0 along the road by an amount that corresponds to the movement distance of the vehicle, the candidate point is excluded as a candidate. If new roads caused by a branch, intersection or the like that continue from roads where candidate points existed during the previous map matching are present within the predetermined distance from the estimated position P1, points on these roads that were moved from the previous estimated position P0 by an amount corresponding to the movement distance of the vehicle are set as candidate points. In the example shown in FIG. 7A, a candidate point B1 is set on a new road caused by a branch. If a new road that does not continue from any of the road where candidate points existed during the previous map matching is present within the predetermined distance from the estimated position P1, a point that intersects a perpendicular line extending from the estimated position P1 to the road is set as a new candidate point.

The best candidate point is found by applying a cost calculation to the candidate points that correspond to the estimated position P1. The cost calculation applied to the candidate points in the present example is calculated using the distance difference and the heading difference from the estimated position P1, a travel state, and a past candidate state. However, the cost calculation may also be calculated based only on distance or only on distance and heading, or calculated in consideration of other factors. The cost calculation concept is described below.

Candidates with smaller values for both the distance difference and heading difference can be considered more likely to be the best candidate. Using a travel state such as vehicle speed, the probability of the vehicle traveling on an expressway is considered high if the vehicle is traveling at a high speed (e.g. 100 km/h). With regard to the past state, the probability of the vehicle traveling on a general (high speed) road is considered high if the vehicle was traveling a general (high speed) road in the near past. Half the cost at the previous candidate point is used as the past candidate state.

Points are assigned to each of the above states (the values of the distance difference and heading difference are used as points), and the total value thereof is calculated as the cost total of each candidate point. The candidate point with the smallest cost total is set as the best candidate point. As an example, suppose that the vehicle is traveling at a speed of 100 km/h. At a candidate point X set on a general road, the distance difference is 5 meters, the heading difference is 5 degrees, the travel state is 10 (because the probability of the vehicle traveling 100 km/h on a general road is low), and the previous cost is 50. In this case, the cost total for the candidate point X is $5+5+10+(50 \cdot 1/2)=45$. Meanwhile, at a candidate point Y set on an expressway, the distance difference is 10 meters, the heading difference is 3 degrees, the travel state is 0 (because the probability of the vehicle traveling 100 km/h on an expressway is high), and the previous cost is 40.

In this case, the cost total for the candidate point Y is $10+3+0+(40 \cdot 1/2)=33$. Based on the above calculation, the candidate point Y with the smallest cost total is identified as the best candidate point. The above calculation example illustrates an approach to the cost total, and the most suitable actual coefficients and addition method are used.

The heading in the advancing direction of the road (road data) where the best candidate point, as identified by the above cost calculation, exists is found and set as the heading of the post-correction estimated position.

Returning to FIG. 6, once the heading of the post-correction estimated position is calculated (S20), the information processing control device 20 acquires the reliability of the estimated heading (S21). Namely the information processing control device 20 calculates each reliability based on the factors of the estimated heading (previous reliability, speculative cumulative heading error, gyro sensitivity learning state), as explained in FIG. 3. The information processing control device 20 then calculates an average value thereof in order to calculate the reliability of the estimated heading.

The information processing control device 20 subsequently acquires the reliability of the GPS heading (S22). Namely the information processing control device 20 calculates each reliability based on the factors of the GPS heading (GPS/estimated path heading coincidence, speed, DOP), as explained in FIG. 4. The information processing control device 20 then calculates an average value thereof in order to calculate the reliability of the GPS heading.

Next, the information processing control device 20 compares the two reliabilities calculated at S21 and S22 (S23). If the reliability of the estimated heading is greater than the reliability of the GPS heading (S23: Y), the information processing control device 20 acquires the speculative heading error that corresponds to the reliability of the estimated heading in accordance with the definition of reliability explained in FIG. 2 (S24).

The information processing control device 20 then determines whether the heading of the post-correction estimated path is within the range of the acquired speculative heading error (S25). That is, the information processing control device 20 determines whether the difference ($\theta 1$ in FIG. 7B) between the estimated heading at the estimated position P1 found at S20 and the heading of the post-correction estimated position is equal to or less than the speculative heading error.

If the heading difference $\theta 1$ is equal to or less than the speculative heading error (S25: Y), the information processing control device 20 corrects the estimated position to the best candidate position (S26) and returns to the main routine.

Figure 7A:
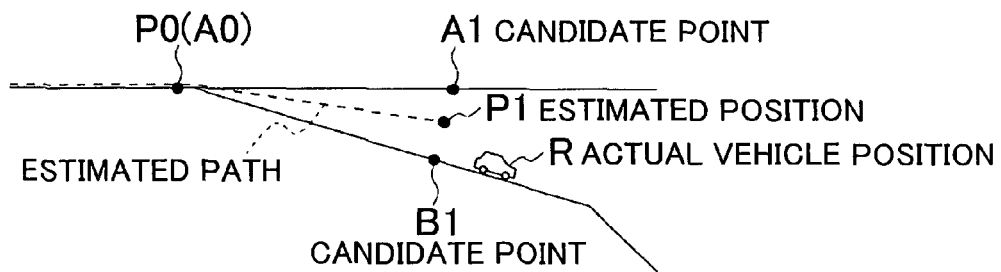
FIGS. 7A to 7C are explanatory phase diagrams of the estimated position definition process.
Figure 7B:
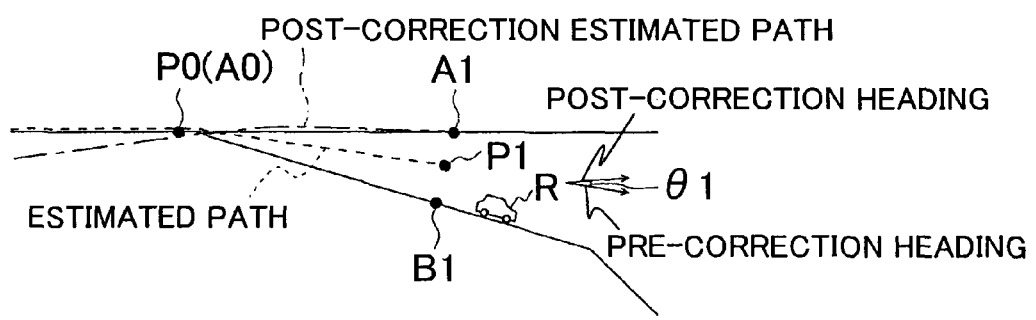

Using FIG. 7B as an example, if the best candidate point for the estimated position P1 is the candidate point A1, the advancing direction of the road containing the best candidate point A1 becomes the post-correction heading, and the difference between the post-correction heading and the estimated heading (pre-correction heading) calculated from the estimated path is $\theta 1$. If $\theta 1$ is equal to or less than the speculative heading error, the estimated position P1 is corrected (changed) to the best candidate position A1. If the heading difference $\theta 1$ is greater than the speculative heading error (S25: N), the information processing control device 20 does not correct the estimated position to the best candidate position and returns to the main routine. In other words, the candidate point A1 in FIG. 7B is more suitable than the other candidate point B1. However, there is a high probability of a false match because the heading difference $\theta 1$ is greater than the speculative heading error. Therefore, the estimated position P1 is not changed to the best candidate point A1, and the information processing control device 20 returns to the main routine.

Thus, a false match caused by correcting the estimated position P1 to the best candidate point A1 on the road can be avoided if the heading difference $\theta 1$ is greater than the speculative heading error.

Figure 7C:
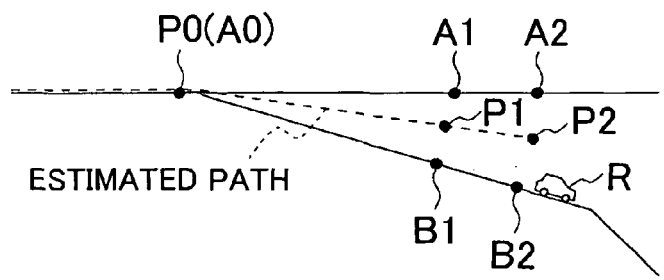

As shown in FIG. 7C, in subsequent map matching, the next estimated position P2 is calculated from the uncorrected estimated position P1. Therefore, the estimated position P2 can be quickly reversed to the correct candidate point B2. Accordingly, the current position mark of the vehicle displayed on the display 42 can also be promptly reversed to the correct road. However, if the reliability of the GPS heading is equal to or greater than the reliability of the estimated heading (S23: N), the information processing control device 20 acquires the speculative heading error that corresponds to the reliability of the GPS heading in accordance with the definition of reliability explained in FIG. 2 (S27).

Figure 8A:
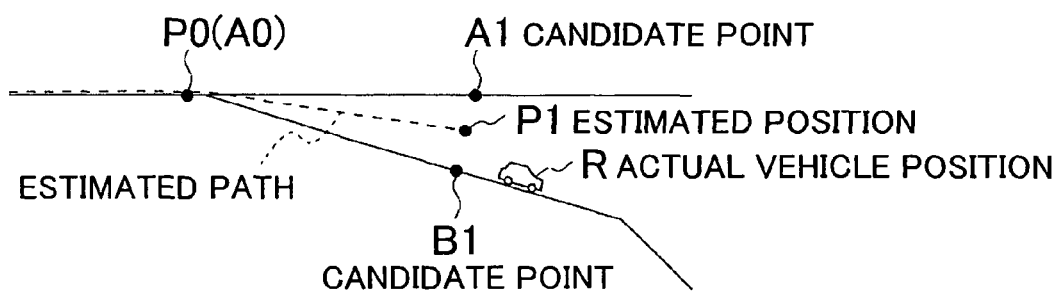
FIGS. 8A to 8C are other explanatory phase diagrams of the estimated position definition process.
Figure 8B:
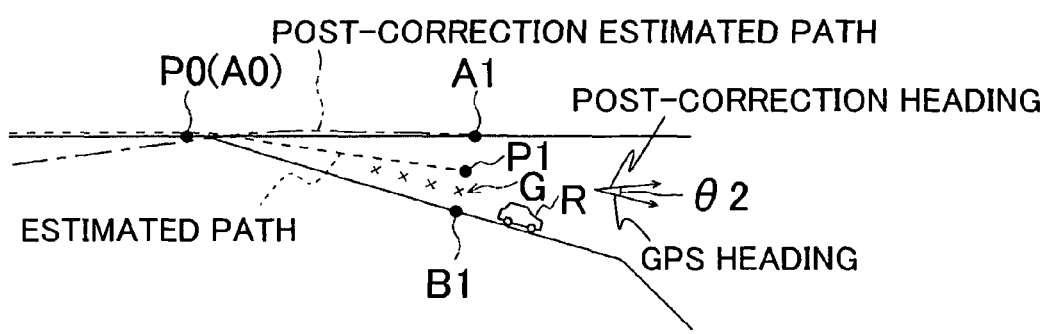

The information processing control device 20 then determines whether the heading of the post-correction estimated path is within the range of the acquired speculative heading error (S28). That is, the information processing control device 20 determines whether a difference $\theta 2$ between the GPS heading calculated from a GPS movement path G and the heading of the post-correction estimated position calculated at S20, as shown in FIG. 8B, is equal to or less than the speculative heading error.

If the heading difference $\theta 2$ is equal to or less than the speculative heading error (S28: Y), the information processing control device 20 corrects the estimated position P1 to the best candidate point A1 as explained using FIG. 7B (S29) and returns to the main routine. However, if the heading difference $\theta 2$ is greater than the speculative heading error (S28: N), the information processing control device 20 does not correct the estimated position P1 to the best candidate point A1 and returns to the main routine. In other words, the candidate point A1 in FIG. 8B is more suitable than the other candidate point B1. However, there is a high probability of a false match because the heading difference $\theta 2$ is greater than the speculative heading error. Therefore, the estimated position P1 is not changed to the best candidate point A1, and the information processing control device 20 returns to the main routine. Thus, a false match caused by correcting the estimated position P1 to the best candidate point A1 on the road can be avoided if the heading difference $\theta 2$ is greater than the speculative heading error.

Figure 8C:
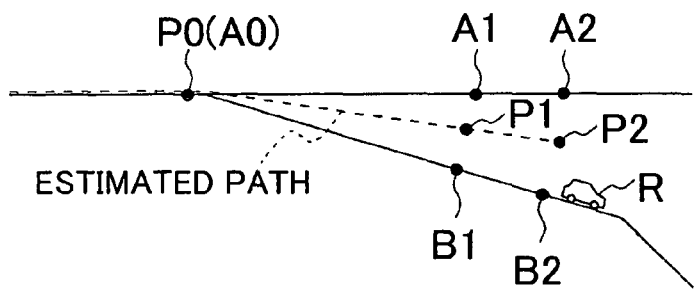
Figure 9A:
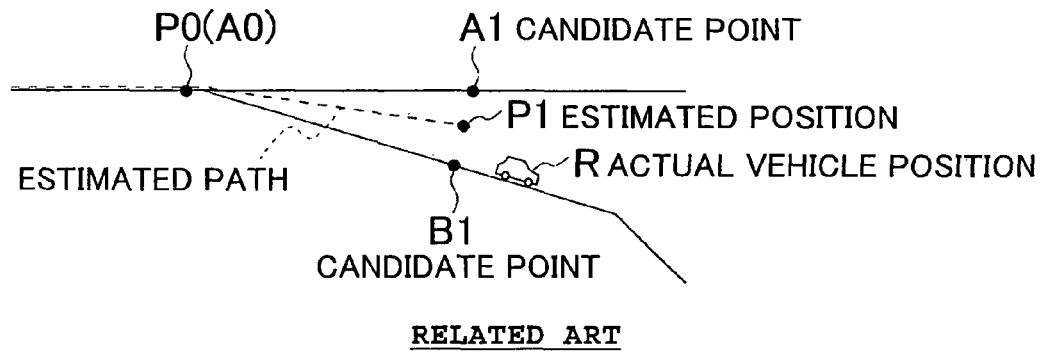
FIGS. 9A to 9C are explanatory drawings that outline a conventional map matching process.
Figure 9B:
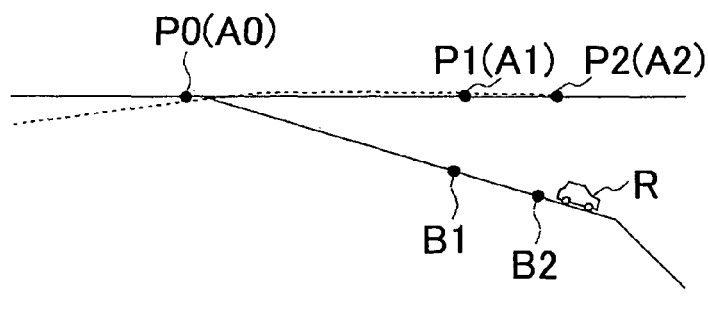
Figure 9C:
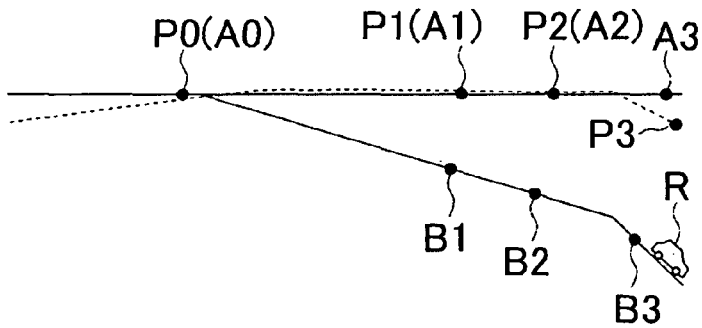

As shown in FIG. 8C, in subsequent map matching, the next estimated position P2 is calculated from the uncorrected estimated position P1. Therefore, the estimated position P2 can be quickly reversed to the correct candidate point B2. Accordingly, the current position mark of the vehicle displayed on the display 42 can also be promptly reversed to the correct road.

According to the navigation device of the present example as described above, the speculative heading error for the estimated position P1 calculated by dead reckoning navigation is found based on the higher reliability among the reliability of the estimated heading and the reliability of the GPS heading. The estimated position P1 is not corrected if the heading difference $\theta$ between the heading with higher reliability and the heading of the advancing direction when the estimated position P1 is corrected to the best candidate point is not within the range of the speculative heading error. Thus, even if the current position mark of the vehicle is moved to the best candidate point on the display of the display 42 and a false match occurs, the actual estimated position P1 is not corrected (moved) and the uncorrected estimated position P1 is used as a reference to calculate the next estimated position P2. Therefore, in subsequent processes, the current position mark and the estimated position can be more promptly reversed to the correct road.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in the example described above, the speculative heading error is calculated from the higher reliability among the reliability of the estimated heading and the reliability of the GPS heading. However, the speculative heading error may be calculated from the reliability of the estimated heading, and then a determination made regarding whether the estimated position should be corrected to the best candidate point based on whether the heading difference $\theta 1$ is within the speculative error range.

An example of map matching was described in which an estimated position calculated by dead reckoning navigation is used as a reference. However, map matching may be performed using a GPS position found from GPS measurement values as a reference. In other words, if the heading difference θ2 between the GPS heading and the heading of the advancing direction (on the road) when the GPS position is moved to the best candidate point is within the range of the speculative heading error based on reliability, the GPS position is corrected to the best candidate point; if outside the range, the GPS position is not corrected. In such case, the reliability of the GPS heading may be used as the reliability for determining the speculative heading error, or the higher reliability among the reliability of the GPS heading and the reliability of the estimated heading may be used.

In the present example, the estimated position P1 is not corrected if the heading difference θ2 (see FIG. 8B) is greater than the speculative error. However, the estimated position P1 may be corrected to the GPS position identified by GPS because the reliability of the GPS heading is higher than the reliability of the estimated heading.

The estimated position P1 is identified by the movement distance and movement heading with respect to the previous estimated position P0. Therefore, the movement distance may use a value calculated by dead reckoning navigation and the movement heading may use the GPS heading.

In the example and modifications described above, the vehicle position is corrected if the heading difference θ between the pre- and post-correction vehicle positions (estimated positions or GPS positions) is within the speculative error range; if outside the range, the vehicle position is not corrected. However, if a traveled path is used as data, positions that deviate from the road will be saved as the path. For example, in the case of FIG. 7C, if P1 is not corrected and P2 is corrected to B2, the travel path becomes P0→P1→B2. Hence, regarding the vehicle position (estimated position or GPS position) not corrected to the best candidate point by map matching, if the vehicle position is corrected to the best candidate point in subsequent map matching, the uncorrected vehicle position is then corrected to a candidate point on the road set with the corrected best candidate point.

In the example of FIG. 7C, if the next estimated position P2 is corrected to the best candidate point B2, the uncorrected estimated position P1 is corrected to the candidate point B1, which is set corresponding to the estimated position P1 and is on the road containing the best candidate point B2.

Note that when saving the estimated path calculated by dead reckoning navigation, the estimated heading may be corrected to the heading in the advancing direction on the road when the estimated position is moved to the best candidate point, instead of correcting the estimated position to the best candidate position in the map matching process. This heading correction may be performed by rotating the estimated heading on the estimated position defined by the previous map matching, for example.

What is claimed is:

1. A navigation device for a vehicle, comprising:
a controller that:
recalls a previous vehicle position;
uses the previous vehicle position as a reference and calculates an estimated vehicle position as a result of subsequent movement;
uses the estimated vehicle position in a map matching process to select a best candidate position from candidate positions that are set on roads around the estimated vehicle position;
calculates a vehicle heading corresponding to the estimated vehicle position;
calculates a heading reliability at the estimated vehicle position;
acquires a speculative heading error that corresponds to the calculated heading reliability;
calculates a candidate heading as a heading when the estimated vehicle position is corrected to the best candidate position;
calculates a heading difference between the vehicle heading and the candidate heading;
determines whether the calculated heading difference is within the acquired speculative heading error;
sets the best candidate position as a current vehicle position if the calculated heading difference is within the acquired speculative heading error; and
sets the estimated position as the current vehicle position if the calculated heading difference is not within the acquired speculative heading error.

2. The navigation device according to claim 1, wherein:
the estimated vehicle position is estimated by dead reckoning navigation using the previous vehicle position as a reference.

3. The navigation device according to claim 1, wherein:
the estimated vehicle position is estimated by dead reckoning navigation using the previous vehicle position as a reference; and
the controller:
calculates the reliability of an estimated heading at the estimated vehicle position;
measures a GPS position that corresponds to the vehicle estimated position;
calculates a reliability of a GPS heading according to the measured GPS position;
determines which of the reliability of the estimated heading or the reliability of the GPS heading has a higher reliability; and
uses the heading with higher reliability to acquire the speculative heading error that corresponds to the calculated reliability.

4. The navigation device according to claim 3, wherein the controller:
calculates the reliability of the GPS heading based on at least one of:
a distance between a GPS path and an estimated path;
an average heading difference between the GPS path and the estimated path;
a speed of the vehicle; and
a horizontal dilution of precision.

5. The navigation device according to claim 3, wherein the controller:
calculates the reliability of the estimated heading based on at least one of:
a previous reliability;
a speculative cumulative heading error;
a gyro sensitivity learning state;
an estimated heading reliability; and
a distance coefficient learning state.

6. The navigation device according to claim 1, further comprising:
a display unit;
wherein the controller:
displays a map corresponding to the vehicle position on the display unit; and displays a current position mark of the vehicle on the displayed map at a point on the map that corresponds to the best candidate position, regardless of the set current vehicle position.

7. A navigation method for a vehicle, comprising:
recalling, with a controller, a previous vehicle position;
using the previous vehicle position as a reference and calculating, with the controller, an estimated vehicle position as a result of subsequent movement;
using the estimated vehicle position in a map matching process to select, with the controller, a best candidate position from candidate positions that are set on roads around the estimated vehicle position;
calculating, with the controller, a vehicle heading corresponding to the estimated vehicle position;
calculating, with the controller, a heading reliability at the estimated vehicle position;
acquiring, with the controller, a speculative heading error that corresponds to the calculated heading reliability;
calculating, with the controller, a candidate heading as a heading when the estimated vehicle position is corrected to the best candidate position;
calculating, with the controller, a heading difference between the vehicle heading and the candidate heading;
determining, with the controller, whether the calculated heading difference is within the acquired speculative heading error;
setting, with the controller, the best candidate position as a current vehicle position if the calculated heading difference is within the acquired speculative heading error; and
setting, with the controller, the estimated position as the current vehicle position if the calculated heading difference is not within the acquired speculative heading error.

8. The navigation method according to claim 7, wherein:
the estimated vehicle position is estimated by dead reckoning navigation using the previous vehicle position as a reference.

9. The navigation method according to claim 7, wherein:
the estimated vehicle position is estimated by dead reckoning navigation using the previous vehicle position as a reference; and
the method further comprises:
calculating the reliability of an estimated heading at the estimated vehicle position;
measuring a GPS position that corresponds to the vehicle estimated position;
calculating a reliability of a GPS heading according to the measured GPS position;
determining which of the reliability of the estimated heading or the reliability of the GPS heading has a higher reliability; and
using the heading with higher reliability to acquire the speculative heading error that corresponds to the calculated reliability.

10. The navigation method according to claim 9, further comprising:
calculating the reliability of the GPS heading based on at least one of:
a distance between a GPS path and an estimated path;
an average heading difference between the GPS path and the estimated path;
a speed of the vehicle; and
a horizontal dilution of precision.

11. The navigation method according to claim 9, further comprising:
calculating the reliability of the estimated heading based on at least one of:
a previous reliability;
a speculative cumulative heading error;
a gyro sensitivity learning state;
an estimated heading reliability; and
a distance coefficient learning state.

12. The navigation method according to claim 7, further comprising:
displaying a map corresponding to the vehicle position on a display unit; and
displaying a current position mark of the vehicle on the displayed map at a point on the map that corresponds to the best candidate position, regardless of the set current vehicle position.

13. The navigation method according to claim 7, wherein the steps of the method are implemented by a controller.

14. A non-transitory computer-readable storage medium storing a computer-executable program usable to provide navigation to a vehicle, the program comprising:
instructions for recalling a previous vehicle position;
instructions for using the previous vehicle position as a reference and calculating an estimated vehicle position as a result of subsequent movement;
instructions for using the estimated vehicle position in a map matching process to select a best candidate position from candidate positions that are set on roads around the estimated vehicle position;
instructions for calculating a vehicle heading corresponding to the estimated vehicle position;
instructions for calculating a heading reliability at the estimated vehicle position;
instructions for acquiring a speculative heading error that corresponds to the calculated heading reliability;
instructions for calculating a candidate heading as a heading when the estimated vehicle position is corrected to the best candidate position;
calculating a heading difference between the vehicle heading and the candidate heading;
instructions for determining whether the calculated heading difference is within the acquired speculative heading error;
instructions for setting the best candidate position as a current vehicle position if the calculated heading difference is within the acquired speculative heading error; and
instructions for setting the estimated position as the current vehicle position if the calculated heading difference is not within the acquired speculative heading error.

15. The non-transitory computer-readable storage medium according to claim 14, the program further comprising:
instructions for displaying a map corresponding to the vehicle position on a display unit; and
instructions for displaying a current position mark of the vehicle on the displayed map at a point on the map that corresponds to the best candidate position, regardless of the set current vehicle position.

* * * * *